United States Patent
Pan et al.

(10) Patent No.: US 8,421,524 B2
(45) Date of Patent: Apr. 16, 2013

(54) CHARGE PUMP SYSTEMS WITH REDUCTION IN INEFFICIENCIES DUE TO CHARGE SHARING BETWEEN CAPACITANCES

(71) Applicant: SanDisk Technologies Inc., Plano, TX (US)

(72) Inventors: Feng Pan, Fremont, CA (US); Jonathan H. Huynh, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/625,128

(22) Filed: Sep. 24, 2012

(65) Prior Publication Data

US 2013/0038381 A1 Feb. 14, 2013

Related U.S. Application Data (62) Division of application No. 12/973,641, filed on Dec. 20, 2010, now Pat. No. 8,294,509.

(51) Int. Cl.
*G05F 1/10* (2006.01)

(52) U.S. Cl.
USPC ........................................................ 327/536

(58) Field of Classification Search ............. 327/535, 327/536, 537
See application file for complete search history.

(56) References Cited

U.S. PATENT DOCUMENTS

| | | | |
|---|---|---|---|
| 3,697,860 A | 10/1972 | Baker | |
| 4,511,811 A | 4/1985 | Gupta | |
| 4,583,157 A | 4/1986 | Kirsch et al. | |
| 4,636,748 A | 1/1987 | Latham | |
| 4,736,121 A | 4/1988 | Cini et al. | |
| 4,888,738 A | 12/1989 | Wong et al. | |
| 5,140,182 A | 8/1992 | Ichimura | |
| 5,168,174 A | 12/1992 | Naso et al. | |
| 5,175,706 A | 12/1992 | Edme | |
| 5,263,000 A | 11/1993 | Van Buskirk et al. | |

(Continued)

FOREIGN PATENT DOCUMENTS

DE 10 2007 026290 7/2008
EP 0 382 929 A 8/1990

(Continued)

OTHER PUBLICATIONS

Feng Pan et al., "Charge Pump Circuit Design", McGraw-Hill, 2006, 26 pages.

(Continued)

*Primary Examiner* — Jeffrey Zweizig
(74) *Attorney, Agent, or Firm* — Davis Wirght Tremaine LLP (57) ABSTRACT

Improvements in the efficiency of two charge pump designs are presented. As a charge pump switches between modes, capacitances are charged. Due to charge sharing between capacitances, inefficiencies are introduced. Techniques for reducing these inefficiencies are presented for two different charge pump designs are presented. For a clock voltage doubler type of pump, a four phase clock scheme is introduced to pre-charge the output nodes of the pump's legs. For a pump design where a set of capacitances are connected in series to supply the output during the charging phase, one or more pre-charging phases are introduced after the reset phase, but before the charging phase. In this pre-charge phase, the bottom plate of a capacitor is set to the high voltage level prior to being connected to the top plate of the preceding capacitor in the series.

12 Claims, 6 Drawing Sheets

U.S. PATENT DOCUMENTS

| | | | |
|---|---|---|---|
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,563,779 A | 10/1996 | Cave et al. |
| 5,563,825 A | 10/1996 | Cernea et al. |
| 5,568,424 A | 10/1996 | Cernea et al. |
| 5,570,315 A | 10/1996 | Tanaka et al. |
| 5,592,420 A | 1/1997 | Cernea et al. |
| 5,596,532 A | 1/1997 | Cernea et al. |
| 5,602,794 A | 2/1997 | Javanifard et al. |
| 5,621,685 A | 4/1997 | Cernea et al. |
| 5,625,544 A | 4/1997 | Kowshik et al. |
| 5,693,570 A | 12/1997 | Cernea et al. |
| 5,732,039 A | 3/1998 | Javanifard et al. |
| 5,734,286 A | 3/1998 | Takeyama et al. |
| 5,767,735 A | 6/1998 | Javanifard et al. |
| 5,781,473 A | 7/1998 | Javanifard et al. |
| 5,801,987 A | 9/1998 | Dinh |
| 5,818,766 A | 10/1998 | Song |
| 5,828,596 A | 10/1998 | Takata et al. |
| 5,903,495 A | 5/1999 | Takeuchi et al. |
| 5,943,226 A | 8/1999 | Kim |
| 5,945,870 A | 8/1999 | Chu et al. |
| 5,969,565 A | 10/1999 | Naganawa |
| 5,973,546 A | 10/1999 | Le et al. |
| 5,982,222 A | 11/1999 | Kyung |
| 6,008,690 A | 12/1999 | Takeshima et al. |
| 6,018,264 A | 1/2000 | Jin |
| 6,023,187 A | 2/2000 | Camacho et al. |
| 6,026,002 A | 2/2000 | Viehmann |
| 6,046,935 A | 4/2000 | Takeuchi et al. |
| 6,104,225 A | 8/2000 | Taguchi et al. |
| 6,107,862 A | 8/2000 | Mukainakano et al. |
| 6,134,145 A | 10/2000 | Wong |
| 6,151,229 A | 11/2000 | Taub et al. |
| 6,154,088 A | 11/2000 | Chevallier et al. |
| 6,188,590 B1 | 2/2001 | Chang et al. |
| 6,198,645 B1 | 3/2001 | Kotowski et al. |
| 6,208,198 B1 | 3/2001 | Lee |
| 6,249,445 B1 | 6/2001 | Sugasawa |
| 6,249,898 B1 | 6/2001 | Koh et al. |
| 6,285,622 B1 | 9/2001 | Haraguchi et al. |
| 6,297,687 B1 | 10/2001 | Sugimura |
| 6,307,425 B1 | 10/2001 | Chevallier et al. |
| 6,314,025 B1 | 11/2001 | Wong |
| 6,320,428 B1 | 11/2001 | Atsumi et al. |
| 6,320,796 B1 | 11/2001 | Voo et al. |
| 6,329,869 B1 | 12/2001 | Matano |
| 6,344,959 B1 | 2/2002 | Milazzo |
| 6,344,984 B1 | 2/2002 | Miyazaki |
| 6,359,798 B1 | 3/2002 | Han et al. |
| 6,369,642 B1 | 4/2002 | Zeng et al. |
| 6,370,075 B1 | 4/2002 | Haeberli et al. |
| 6,400,202 B1 | 6/2002 | Fifield et al. |
| 6,404,274 B1 | 6/2002 | Hosono et al. |
| 6,424,570 B1 | 7/2002 | Le et al. |
| 6,445,243 B2 | 9/2002 | Myono |
| 6,456,170 B1 | 9/2002 | Segawa et al. |
| 6,476,666 B1 | 11/2002 | Palusa et al. |
| 6,486,728 B2 | 11/2002 | Kleveland |
| 6,518,830 B2 | 2/2003 | Gariboldi et al. |
| 6,525,614 B2 | 2/2003 | Tanimoto |
| 6,525,949 B1 | 2/2003 | Johnson et al. |
| 6,531,792 B2 | 3/2003 | Oshio |
| 6,538,930 B2 | 3/2003 | Ishii et al. |
| 6,545,529 B2 | 4/2003 | Kim |
| 6,556,465 B2 | 4/2003 | Wong et al. |
| 6,577,535 B2 | 6/2003 | Pasternak |
| 6,606,267 B2 | 8/2003 | Wong |
| 6,724,241 B1 | 4/2004 | Bedarida et al. |
| 6,734,718 B1 | 5/2004 | Pan |
| 6,760,262 B2 | 7/2004 | Haeberli et al. |
| 6,781,440 B2 | 8/2004 | Huang |
| 6,798,274 B2 | 9/2004 | Tanimoto |
| 6,819,162 B2 | 11/2004 | Pelliconi |
| 6,834,001 B2 | 12/2004 | Myono |
| 6,859,091 B1 | 2/2005 | Nicholson et al. |
| 6,878,981 B2 | 4/2005 | Eshel |
| 6,891,764 B2 | 5/2005 | Li |
| 6,894,554 B2 | 5/2005 | Ito |
| 6,922,096 B2 | 7/2005 | Cernea |
| 6,927,441 B2 | 8/2005 | Pappalardo et al. |
| 6,933,768 B2 | 8/2005 | Hausmann |
| 6,944,058 B2 | 9/2005 | Wong |
| 6,975,135 B1 | 12/2005 | Bui |
| 6,990,031 B2 | 1/2006 | Hashimoto et al. |
| 6,995,603 B2 | 2/2006 | Chen et al. |
| 7,002,381 B1 | 2/2006 | Chung |
| 7,023,260 B2 | 4/2006 | Thorp et al. |
| 7,030,683 B2 | 4/2006 | Pan et al. |
| 7,113,023 B2 | 9/2006 | Cernea |
| 7,116,154 B2 | 10/2006 | Guo |
| 7,116,155 B2 | 10/2006 | Pan |
| 7,120,051 B2 | 10/2006 | Gorobets et al. |
| 7,129,759 B2 | 10/2006 | Fukami |
| 7,135,910 B2 | 11/2006 | Cernea |
| 7,135,911 B2 | 11/2006 | Imamiya |
| 7,208,996 B2 | 4/2007 | Suzuki et al. |
| 7,224,591 B2 | 5/2007 | Kaishita et al. |
| 7,227,780 B2 | 6/2007 | Komori et al. |
| 7,239,192 B2 | 7/2007 | Tailliet |
| 7,253,676 B2 | 8/2007 | Fukuda et al. |
| 7,259,612 B2 | 8/2007 | Saether |
| 7,276,960 B2 | 10/2007 | Peschke |
| 7,279,957 B2 | 10/2007 | Yen |
| 7,345,928 B2 | 3/2008 | Li |
| 7,368,979 B2 | 5/2008 | Govindu et al. |
| 7,397,677 B1 | 7/2008 | Collins et al. |
| 7,468,628 B2 | 12/2008 | Im et al. |
| 7,495,500 B2 | 2/2009 | Al-Shamma et al. |
| 7,521,978 B2 | 4/2009 | Kim et al. |
| 7,554,311 B2 | 6/2009 | Pan |
| 7,579,903 B2 | 8/2009 | Oku |
| 7,671,572 B2 | 3/2010 | Chung |
| 7,696,812 B2 | 4/2010 | Al-Shamma et al. |
| 7,772,914 B2 | 8/2010 | Jung |
| 7,795,952 B2 | 9/2010 | Lui et al. |
| 8,093,953 B2 | 1/2012 | Pierdomenico et al. |
| 8,193,853 B2 | 6/2012 | Hsieh et al. |
| 2002/0008566 A1 | 1/2002 | Taito et al. |
| 2002/0014908 A1 | 2/2002 | Lauterbach |
| 2002/0075706 A1 | 6/2002 | Foss et al. |
| 2002/0130701 A1 | 9/2002 | Kleveland |
| 2002/0140463 A1 | 10/2002 | Cheung |
| 2003/0128560 A1 | 7/2003 | Saiki et al. |
| 2003/0214346 A1 | 11/2003 | Pelliconi |
| 2004/0046603 A1 | 3/2004 | Bedarida et al. |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0244518 A1 | 11/2006 | Byeon et al. |
| 2006/0250177 A1 | 11/2006 | Thorp et al. |
| 2007/0001745 A1 | 1/2007 | Yen |
| 2007/0053216 A1 | 3/2007 | Alenin |
| 2007/0069805 A1 | 3/2007 | Choi et al. |
| 2007/0126494 A1 | 6/2007 | Pan |
| 2007/0139099 A1 | 6/2007 | Pan |
| 2007/0139100 A1 | 6/2007 | Pan |
| 2007/0211502 A1 | 9/2007 | Komiya |
| 2007/0222498 A1 | 9/2007 | Choy et al. |
| 2007/0229149 A1 | 10/2007 | Pan et al. |
| 2008/0024096 A1 | 1/2008 | Pan |
| 2008/0042731 A1 | 2/2008 | Daga et al. |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157852 A1 | 7/2008 | Pan |
| 2008/0157859 A1 | 7/2008 | Pan |
| 2008/0218134 A1 | 9/2008 | Kawakami |
| 2008/0239802 A1 | 10/2008 | Thorp |
| 2008/0239856 A1 | 10/2008 | Thorp |
| 2008/0278222 A1 | 11/2008 | Conti et al. |
| 2008/0307342 A1 | 12/2008 | Furches et al. |

| | | | |
|---|---|---|---|
| 2009/0033306 A1 | 2/2009 | Tanzawa | |
| 2009/0051413 A1 | 2/2009 | Chu et al. | |
| 2009/0058506 A1 | 3/2009 | Nandi et al. | |
| 2009/0058507 A1 | 3/2009 | Nandi et al. | |
| 2009/0091366 A1 | 4/2009 | Baek et al. | |
| 2009/0121780 A1 | 5/2009 | Chen et al. | |
| 2009/0153230 A1 | 6/2009 | Pan et al. | |
| 2009/0153231 A1 | 6/2009 | Pan et al. | |
| 2009/0153232 A1 | 6/2009 | Fort et al. | |
| 2009/0167418 A1 | 7/2009 | Raghavan | |
| 2009/0174441 A1 | 7/2009 | Gebara et al. | |
| 2009/0219077 A1 | 9/2009 | Pietri et al. | |
| 2009/0315616 A1 | 12/2009 | Nguyen et al. | |
| 2009/0322413 A1 | 12/2009 | Huynh et al. | |
| 2010/0019832 A1 | 1/2010 | Pan | |
| 2010/0074034 A1 | 3/2010 | Cazzaniga | |
| 2010/0085794 A1 | 4/2010 | Chen et al. | |
| 2010/0244935 A1 | 9/2010 | Kim et al. | |

FOREIGN PATENT DOCUMENTS

| | | | |
|---|---|---|---|
| EP | 0 780 515 A | 6/1997 | |
| WO | 01/06336 A1 | 1/2001 | |
| WO | WO 2006/132757 | 12/2006 | |

OTHER PUBLICATIONS

Louie Pylarinos et al., "Charge Pumps: An Overview", Department of Electrical and Computer Engineering University of Toronto, 7 pages, May 2003.

Ang et al., "An On-Chip Voltage Regulator Using Switched Decoupling Capacitors," 2000 IEEE International Solid-State Circuits Conference, 2 pages.

U.S. Appl. No. 12/506,998 entitled "Charge Pump with Current Based Regulation" filed Jul. 21, 2009, 21 pages.

U.S. Appl. No. 12/634,385 entitled "Multi-Stage Charge Pump with Variable Number of Boosting Stages" filed Dec. 9, 2009, 33 pages.

Notification of Transmittal of the Int'l Searching Search Report and The Written Opinion of the International Searching Authority, or the Declaration for Int'l Appl. No. PCT/US2011/062890 dated Apr. 10, 2012.

Notice of Allowance and Fees Due for U.S. Appl. No. 12/973,641 mailed Aug. 16, 2012.

Reset Phase

FIG. 5A

Precharging Phase for nb

FIG. 5B

Charging Phase

CHARGE PUMP SYSTEMS WITH REDUCTION IN INEFFICIENCIES DUE TO CHARGE SHARING BETWEEN CAPACITANCES

CROSS-REFERENCE TO RELATED APPLICATION

This application is a divisional of U.S. patent application Ser. No. 12/973,641 filed Dec. 20, 2010, which is herein incorporated in its entirety by this reference.

FIELD OF THE INVENTION

This invention pertains generally to the field of charge pumps and more particularly to improve the efficiency of various charge pump designs by altering the timings for the charging of the capacitances.

BACKGROUND

Figure 1A:
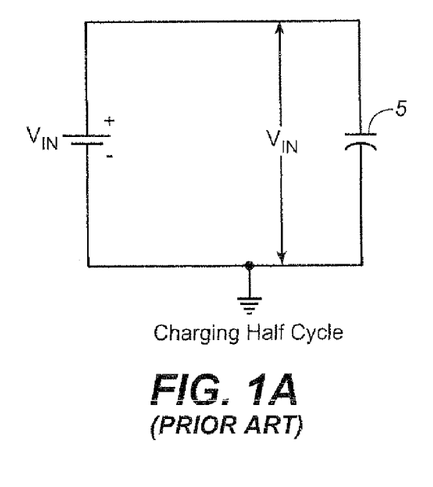
FIG. 1A is a simplified circuit diagram of the charging half cycle in a generic charge pump.
Figure 1B:
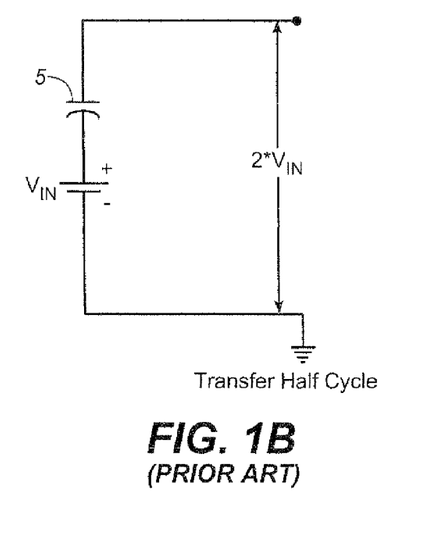
FIG. 1B is a simplified circuit diagram of the transfer half cycle in a generic charge pump.

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2V_{IN}$ with respect to ground. By using several such stages, higher levels can be achieved.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the efficiency of pumps.

SUMMARY OF THE INVENTION

According to a first set of aspects, a charge pump system includes a charge pump and clock generating circuitry. The charge pump includes a first stage having first and second legs. The first leg has: a first capacitor connected between a first internal node and a first clock signal; a first transistor connected between the first internal node and the first stage's input voltage; and a first switch, whereby a first output node is connected to ground when a third clock signal is asserted and the connected to the first internal node when the third clock signal is de-asserted. The second leg has: a second capacitor connected between a second internal node and a second clock signal; a second transistor connected between the second internal node and the first stage's input voltage; and a second switch, whereby a second output node is connected to ground when a fourth clock signal is asserted and connected to the second internal node when the fourth clock signal is de-asserted. The gate of the first transistor is connected to the second internal node and the gate of the second transistor is connected to the first internal node. The charge pump also has a first load capacitance connected between the first output node and ground and a second load capacitance connected between the second output node and ground. The clock generating circuitry provides the first, second, third and fourth clock signal. The first and second clock signal are non-overlapping such that when the first clock signal is high the second clock signal is low, and when the second clock signal is high the first clock signal is low, the third clock signal is de-asserted while the second clock signal is high and reasserted before the second clock signal goes high, and the fourth clock signal is de-asserted while the first clock signal is high and reasserted before the first clock signal goes high.

In other aspects, a method of operating a charge pump is presented. The charge pump includes a first stage comprising: a first leg having a first capacitor with a first plate connected to a first internal node, a first transistor connected between the first internal node and the first stage's input voltage, and a first output node; a second leg having a second capacitor with a second plate connected to a second internal node, a second transistor connected between the second internal node, and the second stage's input voltage, and a second output node, wherein the gate of the first transistor is connected to the second internal node and the gate of the second transistor is connected to the first internal node; a first load capacitance connected between the first output node and ground; and a second load capacitance connected between the second output node and ground. The method comprises: generating and supplying a first clock signal at a second plate of the first capacitor; generating and supplying a second clock signal at a second plate of the second capacitor, wherein the first and second clock signal are non-overlapping such that when the first clock signal is high the second clock signal is low, and when the second clock signal is high the first clock signal is low; generating a third clock, wherein the third clock signal is de-asserted while the second clock signal is high and reasserted before the second clock signal goes high; connecting the first output node to ground when the third clock signal is asserted and to the first internal node when the third clock signal is de-asserted; generating a fourth clock signal, wherein the fourth clock signal is de-asserted while the first clock signal is high and reasserted before the first clock signal goes high; and connecting the second output node to ground when the fourth clock signal is asserted and to the second internal node when the fourth clock signal is de-asserted.

Further aspects include a method of operating a charge pump including a plurality of capacitors, each having a first plate and a second plate. The method includes alternatingly operating the charge pump in a reset phase and a charging phase. The reset phase includes connecting the first plate of each of the capacitors to a low voltage value and connecting the second plate of each of the capacitors to a high voltage value. The charging phase includes connecting the capacitors in series, where the first plate of each capacitor except the first in the series is connected to the second plate of the preceding capacitor in the series, the first plated of the first capacitor in the series is connected to the high voltage value, and the second of the last plate in the series is connected to an output node of the charge pump. The method further includes a pre-charge phase after each reset phase and before the subsequent charging phase, where the pre-charge phase comprises connecting the second plate of one of the capacitors other than the last in the series to the first plate of next capacitor in the series and connecting first plate of said one of the capacitors to the high voltage value.

According to another set of aspects, a charge pump system includes a plurality of capacitors, each having a first plate and a second plate, switching circuitry, and control circuitry. By use of the switching circuitry, the first plate of each of the capacitors can be connected to a low voltage value and the second plate of each of the capacitors can be connected to a high voltage value, and the capacitors can be connected in series, with the first plate of each capacitor except the first in the series is connected to the second plate of the preceding capacitor in the series, the first plate of the first capacitor in the series is connected to the high voltage value, and the second of the last plate in the series is connected to an output node of the charge pump. The control circuitry is connected to the switching circuitry to alternatingly operate the charge pump in a reset phase and a charging phase, where the reset phase includes connecting the first plate of each of the capacitors to a low voltage value and connecting the second plate of each of the capacitors to a high voltage value, and the charging phase includes connecting the capacitors in series, and wherein the control circuitry further connects the switching circuitry in a pre-charge phase after each reset phase and before the subsequent charging phase, where the pre-charge phase comprises connecting the second plate of one of the capacitors other than the last in the series to the first plate of next capacitor in the series and connecting first plate of said one of the capacitors to the high voltage value.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

Charge pumps find many applications in integrated circuit contexts where the system needs, in at least some phases of its operations, voltage values that extend beyond those available from the power supply. In particular, non-volatile memory devices often operate on fairly low supply voltage values, but require higher voltage levels for the writing and erasing of data. The techniques presented here can be advantageously used is such non-volatile memory devices, including the EEPROM based flash memory such as those described in U.S. Pat. Nos. 5,570,315, 5,903,495, 6,046,935 or the sort of "3D" structure presented in U.S. Pat. No. 7,696,812 and references found therein. Whatever their application, as charge pump are typically peripheral elements on a the circuit, there is a desire to make then as efficient, both in terms of power and area, as is practical. A number of different charge pump designs are known, having various relative advantages depending on how their application, but all of these can benefit from improved efficiency. Two specific designs are shown in FIGS. 2A and 2B and FIGS. 3A and 3B.

Figure 2A:
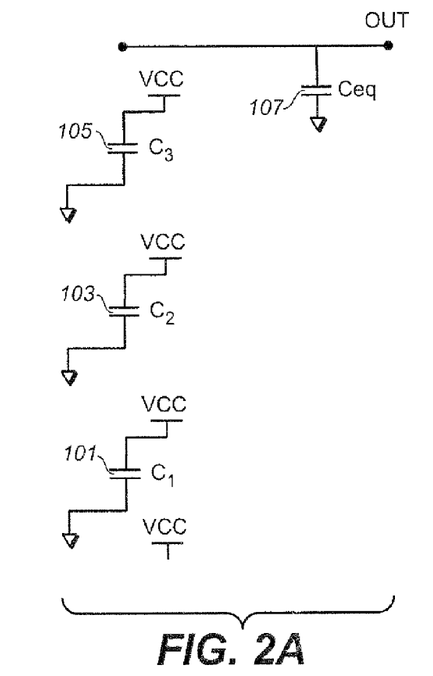
FIGS. 2A and 2B are a schematic illustrations of the operation of one variety of charge pump design of the voltage adder type.
Figure 2B:
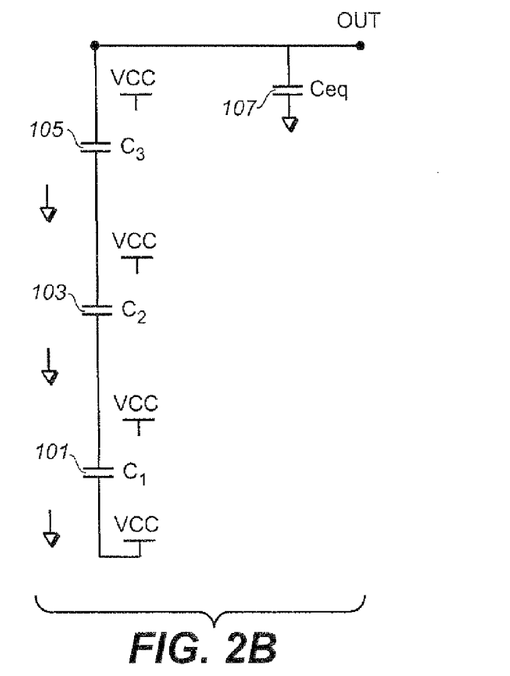

FIGS. 2A and 2B are a schematic illustration of the operation of one variety of charge pump design of the voltage adder type. The pump includes multiple (here 3) stages, each with a capacitor, that alternately operations in a reset phase and a charging phase. In the reset or initialization phase, as shown in FIG. 2A, each of capacitors C1 101, C2 103, and C3 105 has its bottom plate connected to ground (or more generally a lower voltage value) and its top plate connected to Vcc (or more generally a high voltage value). The output of this pump leg is taken from the node out and is not connected to the stage capacitors during reset. A load capacitor Ceq 107 is also connected between the out node and ground. During the charging or transfer phase, when the pump supplies a voltage to output node, the connections are switched as shown in FIG. 2B so that the capacitors are connected in series, with the top plate of each connected to the bottom plate of the next in the series, except for the first capacitor C1 101 that has its bottom plate connected to Vcc and the last capacitor in the series (here C3 105) has its top plate connected to the output node. (The switching circuitry is not explicitly shown here to simplify the discussion, but see FIG. 7 discussed below.) When operating, the pump alternates between the two phases, recharging the capacitors during the reset and then supplying the boosted charge in the charging phase.

Figure 3A:
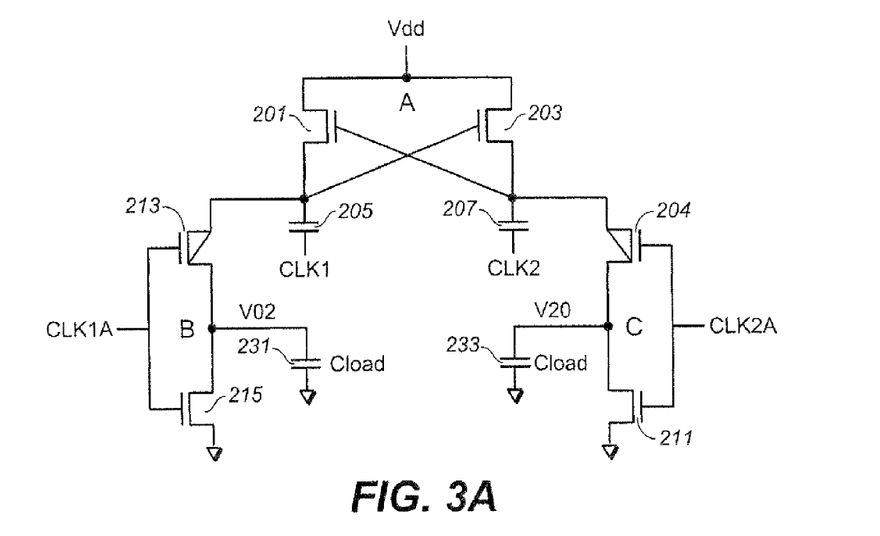
FIGS. 3A and 3B respectively show a schematic of voltage doubler type charge pump and a corresponding timing diagram.
Figure 3B:
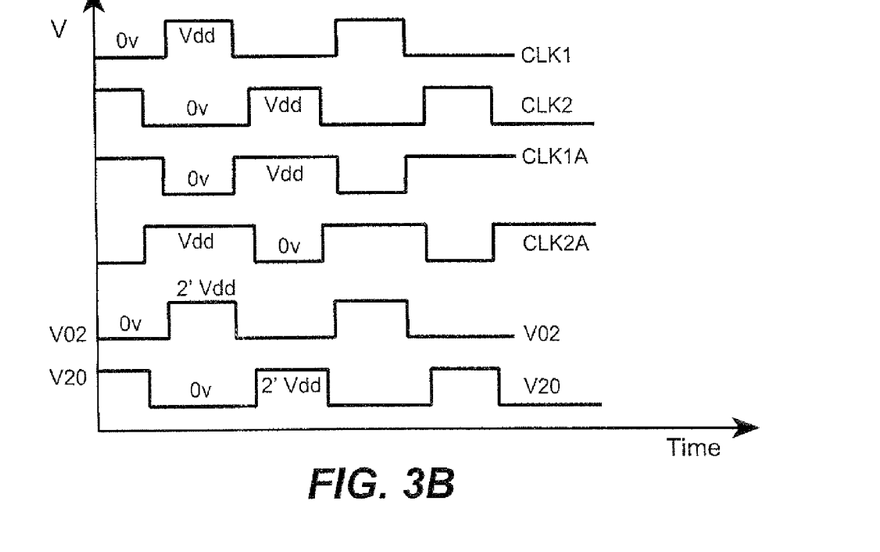

FIGS. 3A and 3B respectively show a schematic of a clock voltage doubler type charge pump and a corresponding timing diagram. The pump has left and right legs each connected to receive from node A the stage's input voltage, here Vdd, and each having a corresponding capacitor 205 and 207. The bottom plate of capacitors 205 and 207 are respectively connected to receive the non-overlapping clock signals CLK1 and CLK2 and the top plates are respectively connected to the input voltage through a switch of NMOS transistor 201 and 203. The gates of these transistor are cross-coupled to the other leg at an intermediate node between the top plate of the capacitor of the other leg and the corresponding transistor of the other leg. The output nodes of the left and right legs are respectively taken at the nodes B and C. The node B is connectable to ground and the top plate of the capacitor 205 be a switch here composed of PMOS 213 and NMOS 215 whose gates are connected to the clock signal CLK1A, which is the inverse of CLK1. Similarly, the node C is connectable to ground and the top plate of the capacitor 207 be a switch here composed of PMOS 209 and NMOS 211 whose gates are connected to the clock signal CLK2A, which is the inverse of CLK2. Each output node is then connected to a load capacitor, 231 and 233 for the left and right output nodes, respectively. Here only a single pump stage is shown, but more generally there may be several such stages before, in which case the input voltage would come from the preceding stage or stages, after, in which case the output would supply the subsequent stages instead of being connected directly to the load capacitances, or both.

FIG. 3B shows an exemplary set of waveforms for the voltage double circuit of FIG. 3A. The two clock signals CLK1 and CLK2 are non-overlapping so that when either one is high, the other is low. The switches for the output node connections are controller by the inverses of CLK1 and CLK2, CLK1A and CLK2A respectively. The outputs at nodes B and C are respectively V02 and V20. As shown, these outputs are (ideally) the clock signals doubled to 2Vdd.

The above discussion of FIGS. 3A and 3B and FIGS. 2A and 2B provided some of the basics of the operation of these two designs, but does not go into further detail on issues such as regulation, multi-stage (including variable stage) operation, or other design issues. More information on these and other issues on charge pumps that can be applied to the embodiments described here can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; 7,795,952; and 7,135,910; US Patent Publication numbers 2009-0153230-A1; 2009-0153232-A1; 2009-0315616-A1; 2009-0322413-A1; and 2009-0058506-A1; and applications Nos. 11/295,906 filed on Dec. 6, 2005; 11/303,387 filed on Dec. 16, 2005; 11/845,939, filed Aug. 28, 2007; 12/135,948 filed Jun. 9, 2008; 12/506,998 filed on Jul. 21, 2009; and 12/570,646 filed on Sep. 30, 2009. Examples of a pump system with a variable number of branches can be found, for example, in U.S. Pat. No. 5,781,473 and with a variable number of stages can be found, for example, in U.S. Pat. Nos. 6,370,075 and 6,486,728 and in U.S. patent application Ser. No. 12/634,385 filed on Dec. 9, 2009.

For the charge pump stage described in the Background with respect to FIGS. 1A and 1B, the output is twice the input voltage. Similarly, for a voltage adder type arrangement shown in FIGS. 2A and 2B, each stage adds Vcc to the preceding stage. However, these are the ideal values and, in an actual application, efficiency will be lost due to charge sharing between capacitor plates. Considering FIGS. 2A and 2B further, in the reset phase, for each of the capacitors the top plates is at Vec and bottom plate at ground. During the charging phase, the bottom plate of C1 101 will be at Vcc, but its top plate will have charge sharing with the bottom plate of C2 103. Similarly, the top plate of C2 103 will share charge with the bottom plate of C3 105 and the top plate of C3 105 will share charge with the load capacitor Ceq 107. Due to this charge sharing between plates, pump efficiency will be lost. This can be illustrated further with respect to FIGS. 4A and 4B.

Figure 4A:
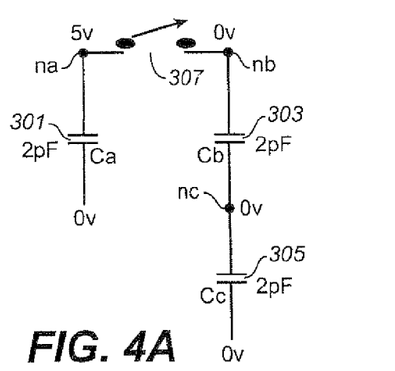
FIGS. 4A and 4B illustrate the loss of efficiency due to charge sharing.
Figure 4B:
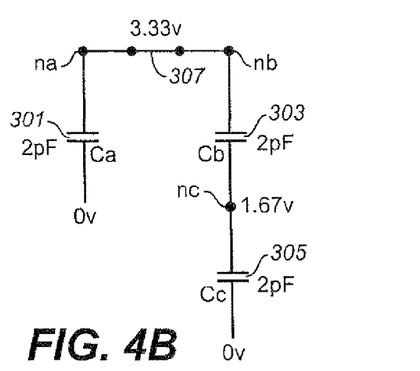

The example FIGS. 4A and 4B shows three capacitors all having the same exemplary value of 2 pF and the high voltage level is here taken as 5V. (Since this is a linear system, the superposition theorem can be applied to see only the effect of charge sharing while omitting the clocking effect.) In the initial, reset condition capacitors Cb 303 and Cc 305 are connected in series as shown, each with both of their plates at ground. The switch 307 is open and the top plate of Ca 301 is at 5V and the bottom plate is at ground. The charge on Ca 301 is Q(Ca)=5V*2 pF=10 pC. The other two capacitors have no charge, Q(Cb)=Q(Cc)=0 C, and node Na is at 5V and nodes Nb, Nc are both at 0V.

FIG. 4B shows the final condition in the charging phase when the switch 307 is closed. Both of nodes Na and Nb will be at 3.33V, while the node is Nc is only at 1.67V. Considering the case where Nc corresponds to the nodes of the pump of FIGS. 2A and 2B and Cc corresponds to the load capacitance Ceq 107, this illustrates how charge sharing between the capacitances can dilute the pumps efficiency.

Similarly, the voltage doubler design of FIGS. 2A and 2B suffers from such a charge dilution at the capacitors. Ideally, the high value of both of V02 and V20 are twice the input value, 2Vdd; but due to parasitic loading and active load, the actual amplitude will be less.

To address this problem and improve pump efficiencies, the following sections consider the use of pre-charging and alterations to the clock signals, first for a pump having the arrangement shown in FIGS. 2A and 2B, and then for the voltage doubler design shown in FIGS. 3A and 3B.

Pre-Charging for Stacked Capacitances

For low power supply operation, the stacking of capacitors in the sort of arrangement discussed above with respect to FIGS. 2A and 2B are used in pump clock drivers to generate high amplitude pump clocks to drive stages. As discussed with respect to FIGS. 4A and 4B, stacking capacitances is bad for power efficiency since charge sharing occurs and the internal node voltages will be lower than expected. This section addresses this issue and improves the efficiency of the pump through a combination of clock controls and selective pre-charging. The idea can be illustrated with respect to FIGS. 5A-C.

Figure 5A:
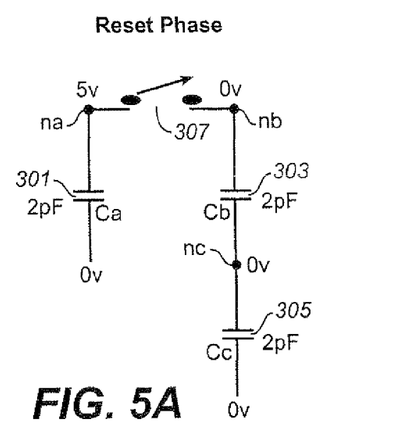
FIGS. 5A-C introduce a pre-charge phase into the process shown in FIGS. 4A and 4B.
Figure 5B:
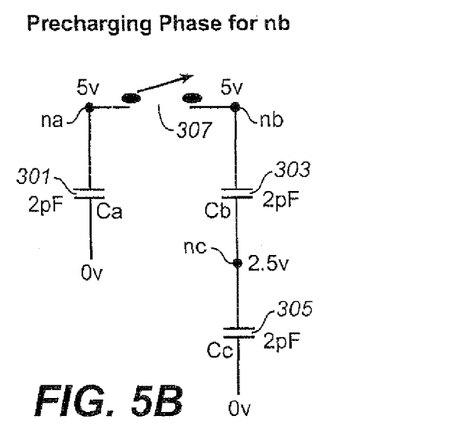

FIG. 5A is an initial condition in a reset phase, corresponds to FIG. 4A and is similarly labeled. FIG. 5B introduces a pre-charge phase for Cb 303. In the pre-charge phase, the node Nb is charged to the high level of, here, 5V. At this point, both of nodes Na and Nb are at 5V and Nc is at 2.5V.

Figure 5C:
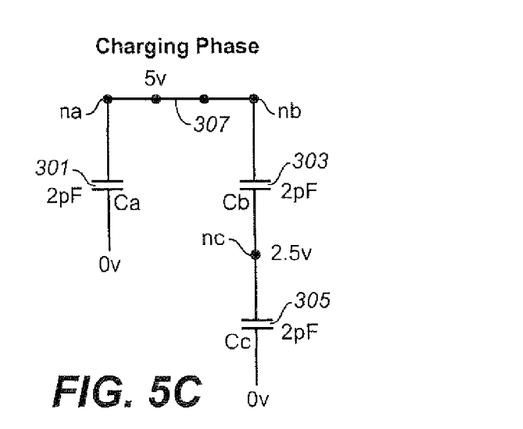

For the charging phase, the switch 307 is closed and the situation is similar to in FIG. 4B, except that the voltage levels will be different due to the pre-charge phase. In this final condition, once the switch is closed the levels on nodes Na and Nb is 5V and at node Nc is 2.5V. Compared to FIGS. 4A and 4B, by pre-charging the node Nb with the supply level before it is connected to Na by the closing of switch 307 the node Nc is switched from 0V to 2.5V. This corresponding raises the voltage on Nc in the charging phase from 1.67V to 2.5V, improving its efficiency. This same principle can be applied to improve clock driver efficiencies for other pump designs as well.

Figure 6A:
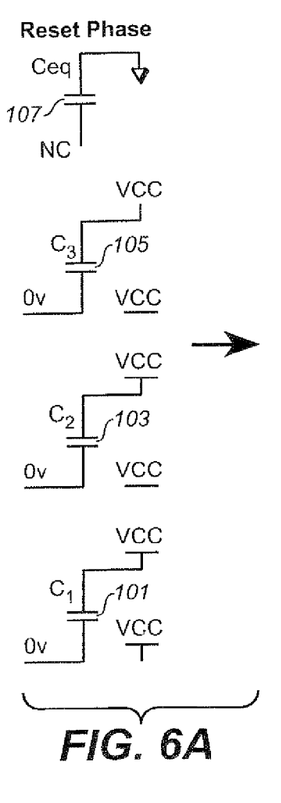
FIGS. 6A-D are a schematic illustration of the operation of the charge pump design of FIGS. 2A and 2B with pre-charging phases included.
Figure 6B:
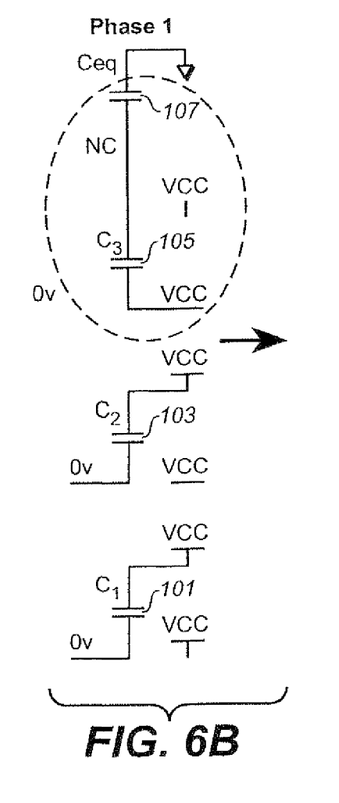
Figure 6C:
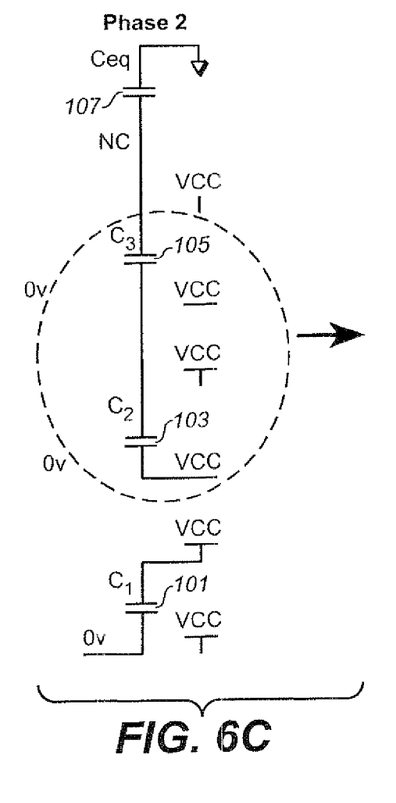
Figure 6D:
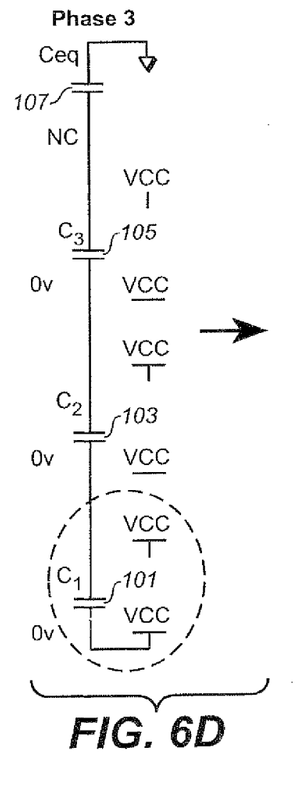

FIGS. 6A-D illustrates how the pre-charging scheme can be applied to the pump design of FIGS. 2A and 2B. For the 3 stage embodiment shown there, an exemplary embodiment using two intermediate pre-charge phases, but in other embodiments less than all of the available pre-charge phases could be used. The high voltage level is again the on-chip high level of Vcc, but other values could be used. (For example, U.S. Pat. No. 7,586,362 uses regulation in an arrangement that could be used here as well.) FIGS. 6A and 6D correspond to FIGS. 2A and 2B and are similarly labeled, but the introduction of the intervening pre-charge stages improves the efficiency and results in a higher output voltage in the charging phase.

After the reset phase in FIG. 6A, FIG. 6B shows "Phase 1", a first pre-charge phase. Capacitors C1 101 and C2 103 remain as in the reset phase, but C3 105 now has its top plate connected to the output node and its bottom plate is precharged to Vcc. In the next pre-charge phase of the sequence, or "Phase 2", as shown in FIG. 6C, the top plate of the preceding capacitor in the series C2 103 has its top plate connected to the bottom plate of C3 105 and its bottom plate set to Vcc for pre-charging. In the charging phase (or "Phase 3") of FIG. 6D, C1 101 and C2 103 are connected in series, with the bottom plate of C1 101 at Vcc, as in FIG. 2B.

Figure 7:
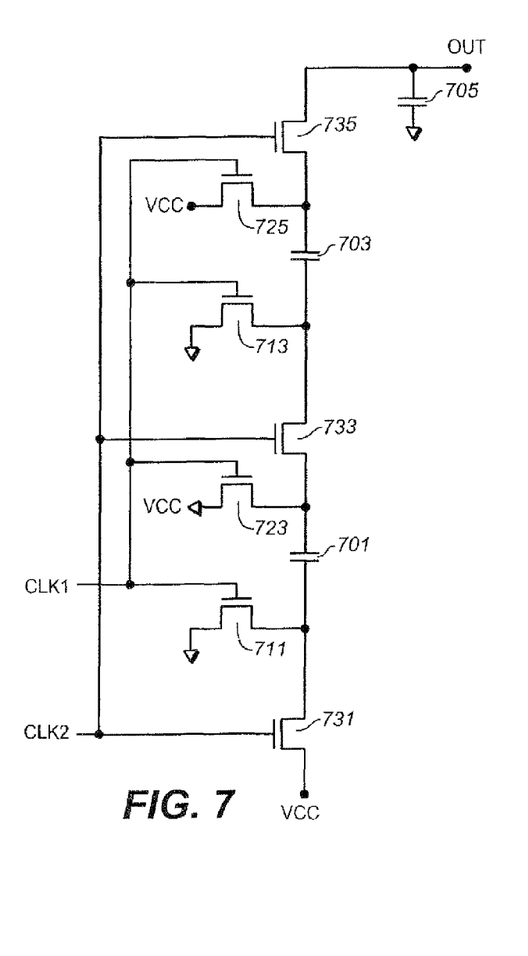
FIG. 7 is a schematic for implementing a 2-stage version for the arrangement of FIGS. 2A and 2B.

FIG. 7 is a schematic for implementing the arrangement of FIGS. 2A and 2B, but for a 2-stage version to keep exposition more manageable. As shown, the capacitors 701 and 703 are arranged in series between Vcc at the bottom and the output node at the top, which is also connected to the load capacitance 705. When the clock signal CLK2 is low, the transistors 731, 733, and 735 are off and the series connections cut off. When CLK1 is high (and CLK2 low), the transistors 711, 713, 723, and 725 are on and the reset phase conditions set. When the clock signals are reversed so that CLK1 is low and CLK2 high, the transistors 711, 713, 723, and 725 are off, the transistors 731, 733, and 735 are on, and the charging phase occurs. The alternation of these provides the clock output. For this 2-stage example, considering the switches to be ideal, taking the internal capacitances at 10 pF, Vcc as 2.5V, and a 500 pF load capacitance to check performance, the output voltage is about 5.3V.

Figure 8:
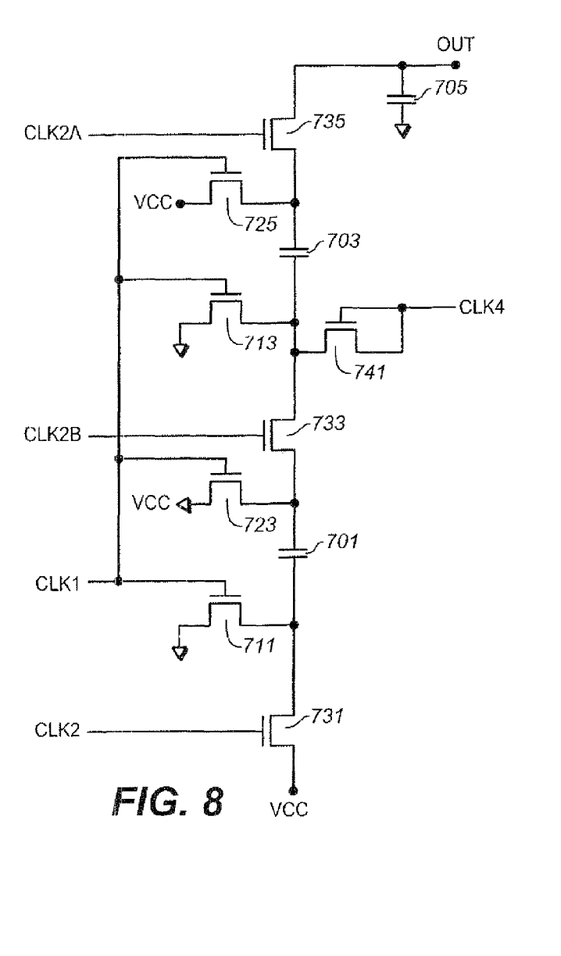
FIG. 8 is a schematic for implementing pre-charging in the charge pump of FIG. 7.

FIG. 8 is a schematic of an implement of a pre-charge phase into the 2-stage design of FIG. 7. A switch 741 has now been added, connected at a node between the two capacitances 701 and 703 and an added clock signal. CLK4. Rather than control all of 731, 733 and 735 all by CLK2, these are now respectively controlled by CLK2, CLK2B, and CLK2A. During reset, CLK1 is again high, and all of CLK4, CLK2A, CLK2B, and CLK2 are low. In the charging phase, CLK1 is again low, and all of CLK4, CLK2A, CLK2B, and CLK2 are high. In between, however, to effect the pre-charging, after taking CLK1 low, the other are raised sequentially in the order CLK4, CLK2A, CLK2B, CLK2. This allows the lower plate of 703 to pre-charge, followed by the passing of this charge to the output node, and then followed by the main clock driving the serial capacitance. Using the same values as in FIG. 7, the introduction of the pre-charging allows the output to now be raised by about half a volt to about 5.8V.

Four Phase Clock Scheme for Clock Voltage Doubler

The clock voltage doubler type of pump, such as that shown in FIG. 3A, can also seen improved efficiencies through charge sharing. This can be done by introducing a four-phase clocking scheme for clock doubler to improve power/area efficiency.

Figure 9A:
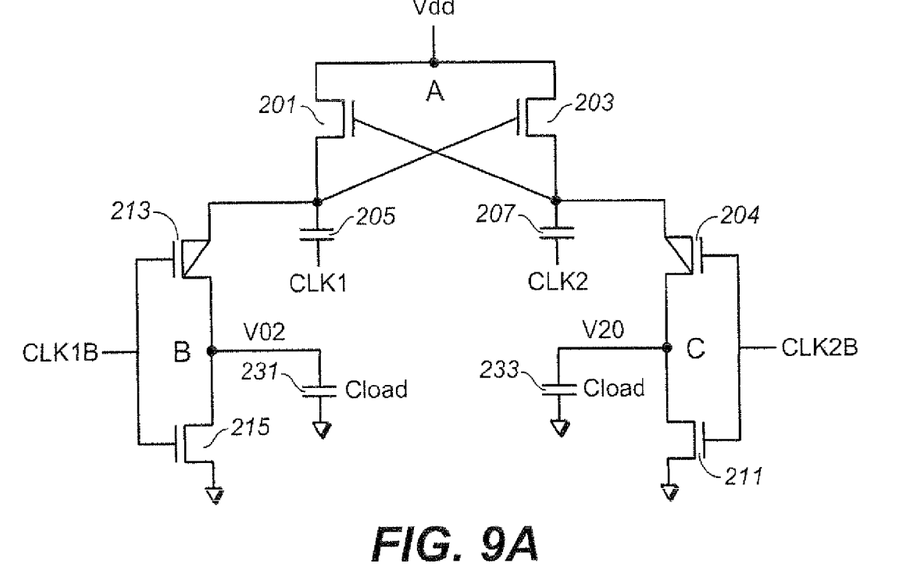
FIGS. 9A and 9B are a schematic illustrations of the operation of one variety of charge pump design of the voltage adder type using a 4-phase clock.

The exemplary clock voltage doubler of FIG. 3A will again be used for the discussion here, as shown in FIG. 9A, but the clock signals CLK1A and CLK2A supplied the switches have been replaced by CLK1B and CLK2B. Although only one stage is stage is shown, as before there may be one or more preceding stages and, rather than the output nodes of the stages' legs being directly attached to the load capacitances 231, 233, there may also be one or more subsequent stages. Also, the switches by which these output nodes B and C are connectable to either ground or the top plate of the legs capacitance (respectively 205, 207) is again formed of a PMOS (213 or 209) and an NMOS (215 or 211) and the clock signals CLK1B, CLK2B are considered asserted when high. What is changed is, however, by the introduction of a four phase clock is the nature of the signals CLK1B and CLK2B and their relationship to CLK1 and CLKK2. This is illustrated with respect to FIG. 9B.

As shown in the top two rows of FIG. 9B, CLK1 and CLK2 are again non-overlapping clocks such that when either one is asserted (high), the other is low. Unlike CLK1A in FIG. 3B, CLK1B in no longer just the inverter version of CLK1. Instead, the falling edge of CLK1B is now earlier than the rising edge of CLK1, the interval between these two events shown in FIG. 9B as T1. As CLKIB is then low while CLK2 is still high, this turns off NMOS 215, turns 213 on, and allows the node B to be pre-charged to Vdd through 201. This again reduces the amount of charge dilution, increasing the output. Similarly, the node C can be pre-charged by de-asserting CLK2B before CLK2 goes high.

Power consumption can also reduced by changing the timing for when CLKIB and CLK2B are reasserted. If CLK1 has its falling edge earlier than the rising edge of CLK1B, as shown in the interval T2 of FIG. 9B, this will allow a portion of the charge on node B (at the voltage V02) to be recycled through the transistor 213 back to the top plate of the capacitor 205 in reset phase of V02. Similarly, if CLK2 has its falling edge earlier than the rising edge of CLK2B, this will allow a portion of the charge on node C (at the voltage V20) to be recycled back to the top plate of the capacitor 207 in reset phase of V20.

Figure 9B:
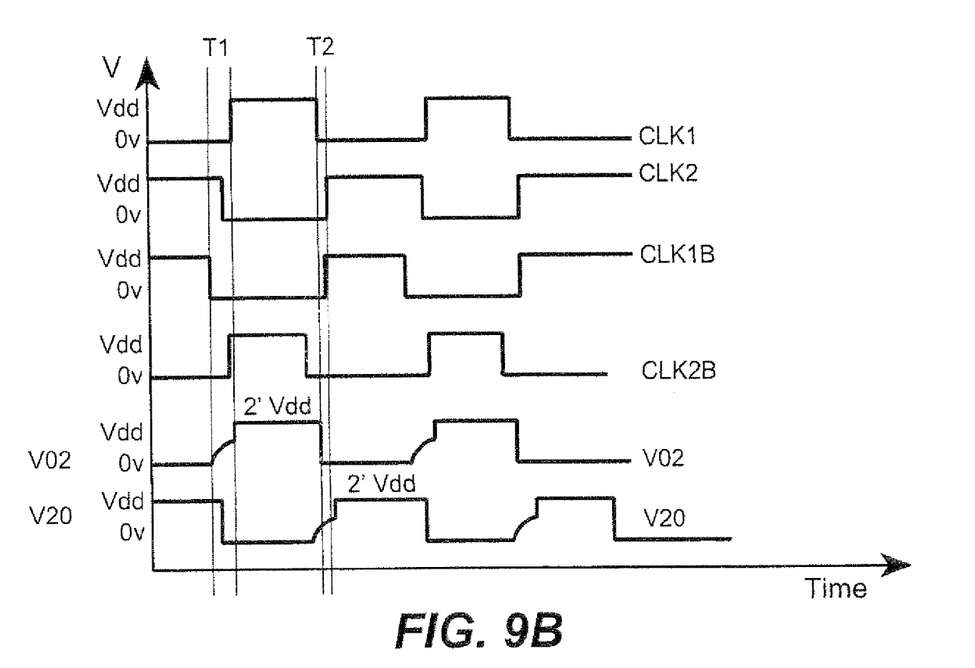

The result of the pre-charging can be seen in the bottom two lines of FIG. 9B. During the interval T1, the level on node B of V02 begins to rise as it is pre-charged to Vdd. CLK 1 then goes high and V02 reaches it full value. Similarly, the voltage V20 on node C begins to pre-charge to Vdd once CLK2B goes low.

To give some exemplary values, taking the pump capacitors 205, 207 at 5 pF, the load capacitances 231, 233 at 1 pF and Vdd at 2.5V, under the arrangement of FIGS. 2A and 2B the high value of V02 and V20 is 4.14V. For the four phase arrangement of FIGS. 9A and 9B using the same values, the high value of V02 and V20 is increased to 4.48V, illustrating the improved area efficiency and power efficiency. To obtain a similar increase by alter the pump capacitances would require a significant increase in their values.

CONCLUSION

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:
1. A charge pump system comprising:
a charge pump, the charge pump including:
a first stage having first and second legs, the first leg having:
a first capacitor connected between a first internal node and a first clock signal;
a first transistor connected between the first internal node and the first stage's input voltage; and
a first switch, whereby a first output node is connected to ground when a third clock signal is asserted and connected to the first internal node when the third clock signal is de-asserted; and
the second leg having;
a second capacitor connected between a second internal node and a second clock signal;
a second transistor connected between the second internal node and the first stage's input voltage; and a second switch, whereby a second output node is connected to ground when a fourth clock signal is asserted and connected to the second internal node when the fourth clock signal is de-asserted, wherein the gate of the first transistor is connected to the second internal node and the gate of the second transistor is connected to the first internal node;

a first load capacitance connected between the first output node and ground; and a second load capacitance connected between the second output node and ground; and clock generating circuitry that provides the first, second, third and fourth clock signal, wherein the first and second clock signal are non-overlapping such that when the first clock signal is high the second clock signal is low, and when the second clock signal is high the first clock signal is low, wherein the third clock signal is de-asserted while the second clock signal is high and reasserted before the second clock signal goes high, and wherein the fourth clock signal is de-asserted while the first clock signal is high and reasserted before the first clock signal goes high.

2. The charge pump system of claim 1, wherein the third clock signal is reasserted after the first clock signal goes low and wherein the fourth clock signal is reasserted after the second clock signal goes low.

3. The charge pump system of claim 1, wherein the third clock signal is high when asserted and low when de-asserted and wherein the fourth clock signal is high when asserted and low when de-asserted.

4. The charge pump system of claim 1, further including one or more additional stages, each with first and second legs through which the first and second output nodes are respectively connected to the first and second load capacitances.

5. The charge pump system of claim 1, further including one or more additional stages from which the first stage's input voltage is supplied.

6. The charge pump system of claim 1, wherein the first switch includes:
   a PMOS transistor connected between first output node and the first internal node and having a gate connected to third clock signal; and
   an NMOS transistor connected between the first output node and ground and having a gate connected to third clock signal; and
wherein the second switch includes:
   a PMOS transistor connected between second output node and the second internal node and having a gate connected to fourth clock signal; and
   an NMOS transistor connected between the second output node and ground and having a gate connected to fourth clock signal.

7. A method of operating a charge pump, the charge pump including a first stage comprising: a first leg having a first capacitor with a first plate connected to a first internal node, a first transistor connected between the first internal node and the first stage's input voltage, and a first output node; a second leg having a second capacitor with a second plate connected to a second internal node, a second transistor connected between the second internal node and the second stage's input voltage, and a second output node, wherein the gate of the first transistor is connected to the second internal node and the gate of the second transistor is connected to the first internal node; a first load capacitance connected between the first output node and ground; and a second load capacitance connected between the second output node and ground, the method comprising:

generating and supplying a first clock signal at a second plate of the first capacitor;

generating and supplying a second clock signal at a second plate of the second capacitor, wherein the first and second clock signal are non-overlapping such that when the first clock signal is high the second clock signal is low, and when the second clock signal is high the first clock signal is low;

generating a third clock, wherein the third clock signal is de-asserted while the second clock signal is high and reasserted before the second clock signal goes high;

connecting the first output node to ground when the third clock signal is asserted and to the first internal node when the third clock signal is de-asserted;

generating a fourth clock signal, wherein the fourth clock signal is de-asserted while the first clock signal is high and reasserted before the first clock signal goes high; and connecting the second output node to ground when the fourth clock signal is asserted and to the second internal node when the fourth clock signal is de-asserted.

8. The method of claim 7, wherein the third clock signal is reasserted after the first clock signal goes low and wherein the fourth clock signal is reasserted after the second clock signal goes low.

9. The method of claim 7, wherein the third clock signal is high when asserted and low when de-asserted and wherein the fourth clock signal is high when asserted and low when de-asserted.

10. The method of claim 7, wherein the charge pump further includes one or more additional stages, each with first and second legs through which the first and second output nodes are respectively connected to the first and second load capacitances.

11. The method of claim 7, wherein the charge pump further includes one or more additional stages from which the first stage's input voltage is supplied.

12. The method of claim 7, wherein the first leg further includes:
   a PMOS transistor connected between first output node and the first internal node and having a gate connected to receive the third clock signal; and
   an NMOS transistor connected between the first output node and ground and having a gate connected to receive the third clock signal; and
wherein the second leg further includes:
   a PMOS transistor connected between second output node and the second internal node and having a gate connected to receive the fourth clock signal; and
   an NMOS transistor connected between the second output node and ground and having a gate connected to receive the fourth clock signal.

* * * * *